United States Patent
Kelley et al.

[11] Patent Number: 6,134,621
[45] Date of Patent: Oct. 17, 2000

[54] VARIABLE SLOT CONFIGURATION FOR MULTI-SPEED BUS

[75] Inventors: Richard Allen Kelley, Apex, N.C.; Danny Marvin Neal, Round Rock, Tex.; James Otto Nicholson; Steven Mark Thurber, both of Austin, Tex.

[73] Assignee: International Business Machines Corporation, Armonk, N.Y.

[21] Appl. No.: 09/092,153

[22] Filed: Jun. 5, 1998

[51] Int. Cl.[7] .............................. G06F 13/00; G06F 13/38; G06F 1/08
[52] U.S. Cl. ......................... 710/126; 710/104; 713/322; 713/500; 713/501; 713/600; 364/240.3
[58] Field of Search ..................................... 710/104, 101, 710/102, 103, 126, 127; 364/240, 240.3, 270, 270.2, 270.3; 713/501, 322, 500, 600

[56] References Cited

U.S. PATENT DOCUMENTS 5,815,734  9/1998  Lee et al. ................................... 710/60
5,857,086  1/1999  Horan et al. .............................. 710/129
5,887,144  3/1999  Guthrie et al. ........................... 710/101
5,918,058  6/1999  Budd ........................................ 713/300
5,937,173  8/1999  Olarig et al. .............................. 710/126

*Primary Examiner*—Ario Etienne
*Attorney, Agent, or Firm*—Robert V. Wilder; Volel Emile

[57] ABSTRACT

A method and apparatus are provided in which a control scheme is implemented to enable a PCI bus to operate more than two PCI slots into which PCI devices may be installed. The PCI slots are checked to determine if a PCI device is installed in the slots and the speed at which the installed PCI devices are capable of running. If any of the slots has a 33 MHz device installed in any of the slots, the system is enabled to run more than two slots, and all of the PCI devices will run at 33 MHz. When no 33 MHz cards or devices are installed in the PCI slots, and PCI devices are only installed in the first two slots, then the system is enabled to run only the first two slots at the speed of 66 MHz. In one alternative embodiment, a default configuration routine sets the PCI bus speed at one of the operating frequencies and modifies that default if it is determined during a system configuration cycle that another speed is more appropriate.

17 Claims, 4 Drawing Sheets

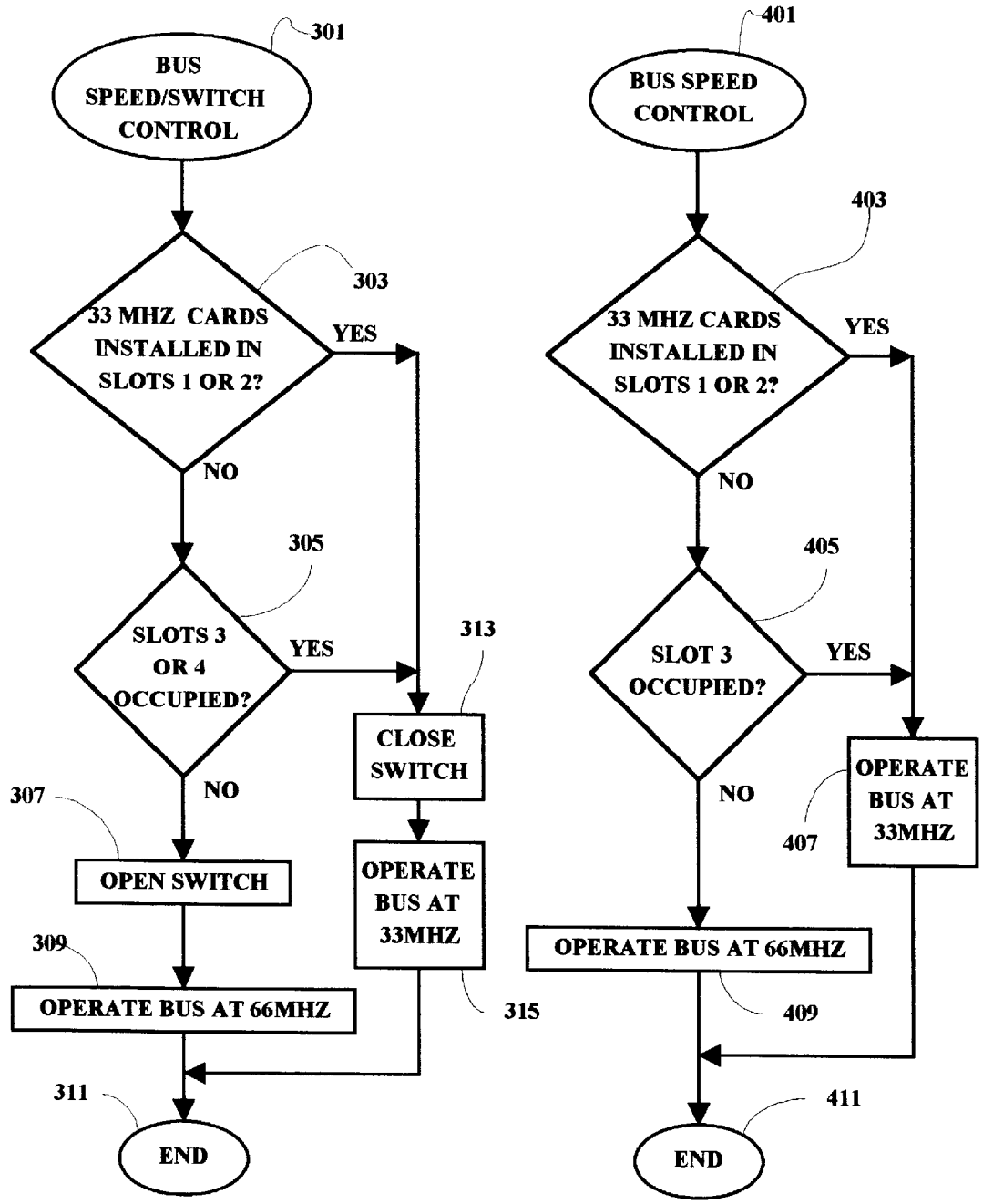
*FIG. 3*   *FIG. 4*

VARIABLE SLOT CONFIGURATION FOR MULTI-SPEED BUS

FIELD OF THE INVENTION

The present invention relates generally to information processing systems and more particularly to varying bus speeds in accordance with slot configurations for PCI systems.

BACKGROUND OF THE INVENTION

The current 66 MHz PCI (Peripheral Component Interconnect) architecture definition is somewhat limited in the amount of the "fan-out" relative to the number of slots for devices as well as the physical length of the bus. The 66 MHz PCI bus specification as published will allow up to 2 "slots", which is the equivalent of five "loads" counting the PCI bridge as a load. A "load" is a PCI device which is soldered to the bus while a "slot" is a mechanism by which a PCI device is selectively engaged with and connected to the bus. In accordance with the PCI specification, the PCI bus is capable of supporting five "loads" or up to two "slots".

The 66 MHz PCI bus is designed to run at 66 MHz but will operate at only 33 MHz whenever a 33 MHz device or adapter card is installed on the bus. However, the PCI bus bandwidth will support more 33 MHz devices when running at 33 MHz. Therefore the need exists for a means to allow more than two slots for a 66 MHz capable PCI bus segment, when the bus is operated at only 33 MHz.

SUMMARY OF THE INVENTION

A method and apparatus is provided for enabling a PCI bus to run more than two PCI slots in a PCI system if any of the slots has a 33 MHz device installed. If any of the slots has a 33 MHz device installed, the PCI bus, and all of the devices coupled thereto, will run at 33 MHz but the bus will run more than two slots thereby taking advantage of otherwise unused but available bandwidth. When no 33 MHz cards or devices are installed in the PCI slots, and PCI devices are installed only in the first two slots, then the system is enabled to run only the first two slots at the speed of 66 MHz. In one embodiment, a switching device is implemented to accomplish PCI bus segmentation when only the first two slots are running. The switching device is further selectively operable to connect additional slots to the PCI bus when the PCI bus is running at 33 MHz. In another alternative embodiment, a default configuration routine sets the PCI bus speed at one of the operating frequencies and modifies that default if it is determined during a system configuration cycle that another speed is more appropriate.

BRIEF DESCRIPTION OF THE DRAWINGS

A better understanding of the present invention can be obtained when the following detailed description of a preferred embodiment is considered in conjunction with the following drawings, in which:

FIG. 3 is a flow chart illustrating an operational flow sequence for the FIG. 1 embodiment;

FIG. 4 is a flow chart illustrating an operational flow sequence for the FIG. 2 embodiments.

DETAILED DESCRIPTION

Figure 1:
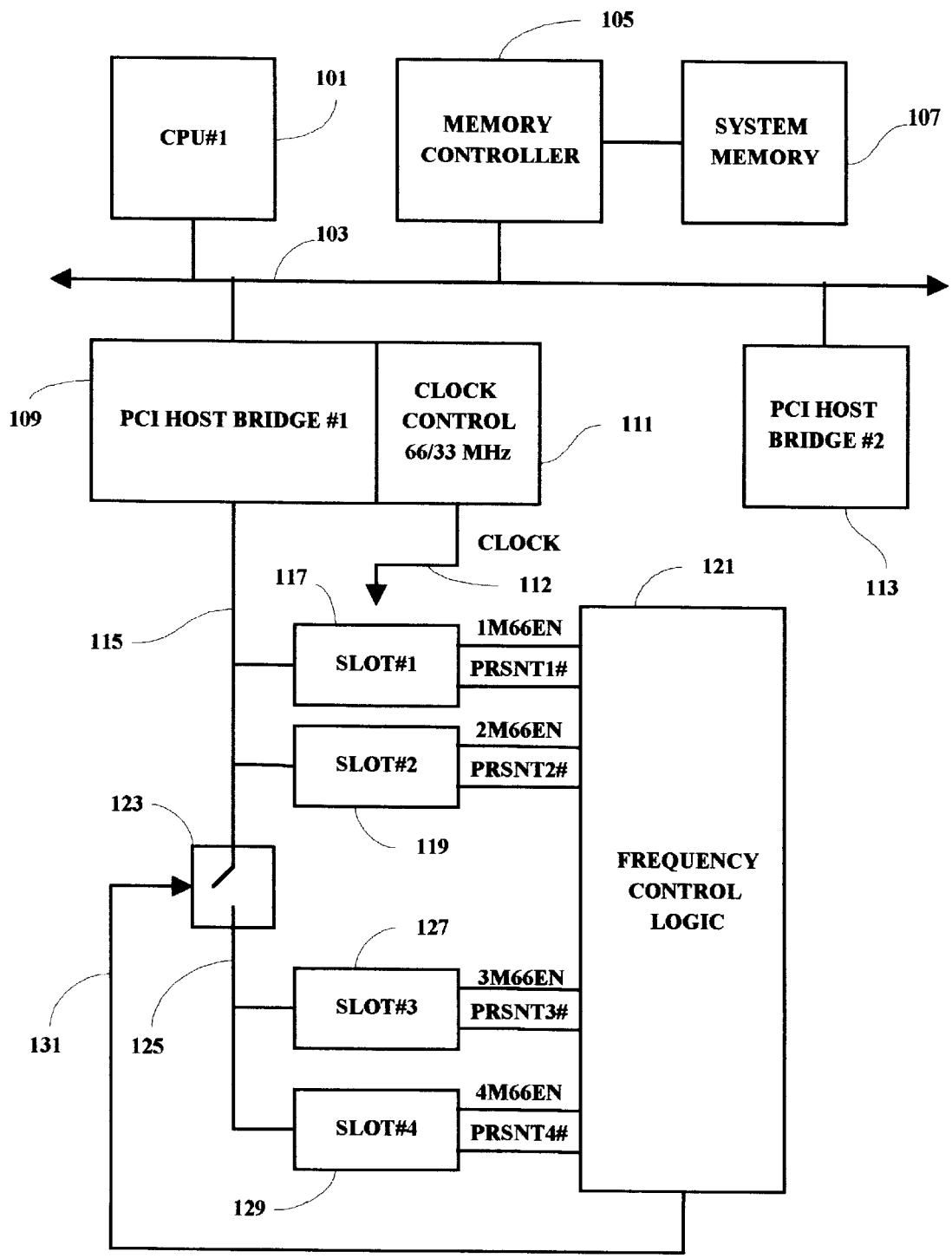
FIG. 1 is a schematic block diagram showing one exemplary embodiment of the present invention.

With reference to FIG. 1, the various methods discussed herein may be implemented within a typical computer system or workstation as illustrated. An exemplary hardware configuration which may be used in conjunction with the present invention includes a CPU (Central Processing Unit) 101 connected to a host bus 103. The bus 103 is also connected to a memory controller unit 105 which, in turn, is connected to system memory 107. The host bus 103 may be extended to include connections to other system devices, networks or related circuitry.

A PCI host bridge circuit or PHB 109 is shown connected to the host bus 103. The host bus 103 is shown to include other PHB devices such as PHB 113. PHB 109 is coupled to a clock control circuit 111 which is capable of selectively delivering either 66 MHz or 33 MHz clock signals 112 to each of a plurality of PCI devices which may be inserted into a series of PCI slots 117, 119, 127 and 129. The CLOCK line 112 in FIG. 1 represents a separate clock line to each PCI evice. As used herein, the terms "PCI device" and "PCI adapter" or "card" are used interchangeably. The PHB 109 is connected to a first segment or portion of a PCI bus 115. The bus 115 is also connected directly to first and second PCI slots 117 and 119, and through a set of isolation switches or series switching devices 123 to additional slots 127 and 129 which are connected to a second segment or portion 125 of the PCI bus. The in-line switch 123 illustrated in FIG. 1 although herein referred to in the singular, actually represents a set of switches that are effective to switch the appropriate signal lines of the bus as hereinafter explained. Each of the slots 117, 119, 127 and 129 is arranged to provide an "M66EN" output and a "PRSNT#" output to a frequency control logic unit 121. The isolation switch 123 may be implemented with, for example, so-called "crossbar" switches which are generally available from semiconductor device manufacturers and others in the open market.

The M66EN signals are PCI specified signals and are representative of the frequency at which a plugged-in PCI device is capable of running. For example, if "1M66EN" is at a zero or low logic level with a device plugged-into slot#1 117, then the device is capable of running at only 33 MHz. However, if the 1M66EN is at a high logic level, then the plugged-in device has not grounded the PCI pin which means that the device is capable of running at 66 MHz. The M66EN signals from the various slots thereby indicate the speed capabilities of the devices plugged-into the respective slots 117, 119, 127 and 129. Although the term "slot" is used to identify a "plug-in" type of connection in the example, it is noted that the term "slot" refers to an interface between an adapter or circuit device and the PCI device bus and such connections may also be accomplished with soldered connections in a hard-wired system and still fall within the scope of the present invention.

The "PRSNT#" outputs from the PCI slots 117, 119, 127 and 129 are indicative of whether or not there is an adapter or device plugged-into, or "present", in the respective PCI slots. The PRSNT# notation actually represents two PRSNT# pins per slot in terms of hardware. In the example, when a device is plugged-into a PCI slot, two device PRSNT# pins ground the PRSNT# lines and that signal is representative that there is a card in the slot.

The device speed capable signals xM66EN and the device present signals PRSNT#x are used in the frequency control logic to determine the speed at which the PCI bus 115 is run and also whether or not the bus switch 123 is opened or closed. The disclosed embodiment provides a solution to the bus speed/load optimization problem by defining a means to allow three to four slots on a 66 MHz capable PCI bus segment for 33 MHz operation when 33 MHz adapters or devices are installed, but also restrict the bus loading to an effective two slots when operated at 66 MHz. The bus switch 123 (also referred to as a "bus isolation switch" or "isolation switch") is implemented in-line with the PCI bus 115 to isolate a set of slots and their loading effects from the rest of the bus. If no M66EN pins are grounded in the first slot 117 or the second slot 119 (i.e. no 33 MHz adapters are installed in those slots), and the third and fourths slots 127 and 129 are not occupied (i.e. no cards installed as indicated by the corresponding PRSNT# signals), then the signal to the clock control circuit 111 will indicate that the bus should be run at 66 MHz. Otherwise, the bus will be operated at 33 MHz.

The logic and flow for the switching and speed determining functions described above in connection with FIG. 1, is illustrated in flow chart form in FIG. 3. Upon initialization 301 a determination 303 is made as to whether there are any 33 MHz cards or adapters installed in slot#1 117 or slot#2 119. If there are any 33 MHz cards installed in the first two slots 117 and 119, then the PCI bus 115 must be run at 33 MHz. But, at 33 MHz, the bus can operate two additional cards in slot#3 127 and slot#4 129. Accordingly, the switch 123 is closed 313 and the frequency control logic effects the operation of the PCI bus at 33 MHz 315, and the process ends 311.

However, if a determination is made that there are no 33 MHz cards installed in the first two slots 117 and 119 (i.e. 66 MHz cards are installed), and neither slot#3 127 nor slot#4 129 is occupied or has an adapter or card present, then the isolation switch 123 is opened 307 thereby isolating slots 127 and 129, and the PCI bus is operated 309 at 66 MHz. If no 33 MHz cards are installed in the first two slots 117 and 119, but slot#3 127 or slot#4 129 is occupied 305, then the bus 115 must be operated at 33 MHz. Accordingly the switch 123 is closed 313 and the PCI bus segments 115 and 125 are operated 315 at 33 MHz.

Thus, four slots can be provided and the PCI bus 115, 125 will be operated at 33 MHz whenever any cards are installed in slot #3 127 or slot#4 129, or whenever a 33 MHz card is installed in slot#1 117 or slot#2 119. If slot#3 127 and slot#4 129 are empty, and slot#1 117 and slot#2 129 have only 66 MHz cards installed, then the bus 115 will be operated at 66 MHz and the isolation switch will be open thereby isolating bus segment 125 and the third and fourth slots 127 and 129 from the PCI bus 115. With the switch 123 open, the loading effects of slot#3 127 and slot#4 129, and their "net length" are isolated from the rest of the bus 115. This allows the bus 115, when operated at 66 MHz to meet the 66 MHz PCI bus loading requirements, while allowing a "fan-out" of up to four slots when the bus 115, including bus segment 125, is operated at 33 MHz. 66 MHz cards should be installed in slot#1 and slot#2 when 66 MHz operation is desired. 33 MHz cards can be installed in any of the slots and the bus will run at 33 MHz.

Figure 2:
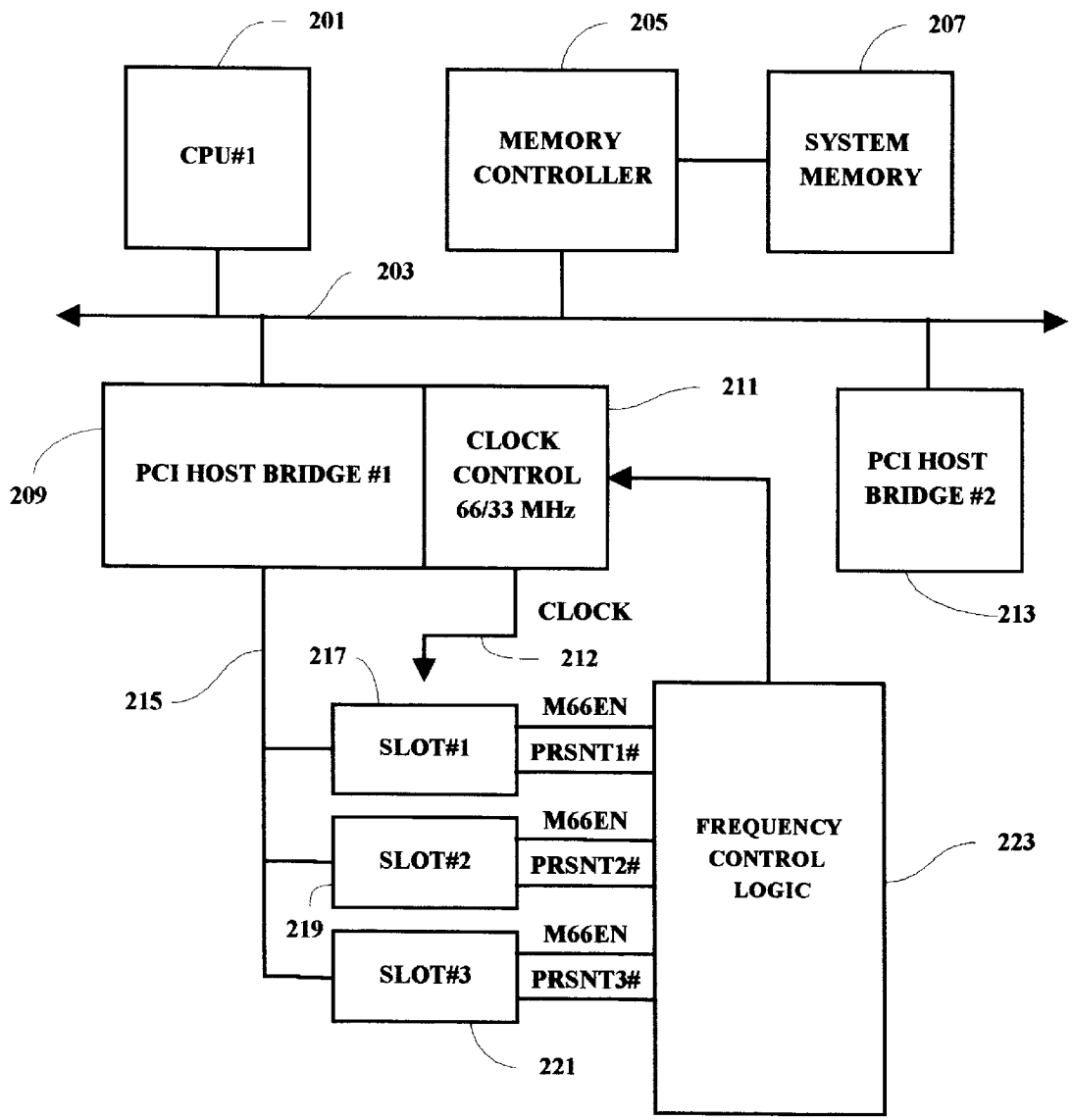
FIG. 2 is a schematic block diagram of a second exemplary embodiment of the present invention.

A second method is illustrated in the FIG. 2 embodiment and is similar to the first approach except that the in-line or isolation switch 123 as shown in FIG. 1 would not be required. As shown in FIG. 2, a CPU (Central Processing Unit) 201 connected to a host bus 203. The bus 203 is also connected to a memory controller unit 205 which, in turn, is connected to system memory 207. The host bus 203 may be extended to include connections to other system devices, networks or related circuitry.

A PCI host bridge circuit or PHB 209 is shown connected to the host bus 203. The host bus 203 is shown to include other PHB devices such as PHB 213. PHB 209 is coupled to a clock control circuit 211 which is capable of selectively delivering either 66 MHz or 33 MHz clock signals 212 to a plurality of PCI devices which may be inserted into a series of PCI slots 217, 219, and 221. The PHB 209 is connected to a PCI bus 215. The bus 215 is also connected directly to the PCI slots 217, 219 and 221. Each of the slots 217, 219, and 221 is arranged to provide an "M66EN" output and a "PRSNT#" output to a frequency control logic unit 223 to determine bus speed in a manner previously explained in connection with FIG. 1. However, In FIG. 2 there are only three slots instead of four as in FIG. 1.

In FIG. 2, the bus frequency control logic 223 unit is utilized to indicate when the bus 215 could be operated at 66 MHz. If no M66EN pins are grounded (i.e. only 66 MHz cards or adapters are installed) in the first two slots 217 or 219, and the third slot 221 is empty (i.e. no card installed), then the bus 215 can be operated at 66 MHz. If any 33 MHz cards are installed on the bus or if a card is installed in the third slot 221, the bus 215 would be operated at 33 MHz. This would allow up to three cards to be installed when the bus 215 is operated at 33 MHz and would also allow 66 MHz operation when only 66 MHz cards are installed in the first two slots 217 and 219 and the third slot 221 is not occupied.

The operation of the implementation shown in FIG. 2 is illustrated in flow chart form in FIG. 4. When the bus speed control function is initiated 401, a determination is made 403 as to whether or not there are any 33 MHz cards installed in either of the first two slots 217 or 219. If not, then a determination is made 405 as to whether or not the third slot 221 is occupied. If no 33 MHz cards are installed in either the first or second slots 217 or 219, and the third slot 221 is not occupied, then the frequency control logic applies a signal to the clock control circuit 211 which is effective to cause the PCI bus 215 to operate at 66 MHz 409 and the process ends 411. If, however, there is one 33 MHz card installed in either slot#1 217 or slot#2, or both, or, slot#3 221 is occupied (regardless of the speed capability of the card in slot#3 221), then the bus will be operated at 33 MHz 407 but three slots will be usable.

Figure 5:
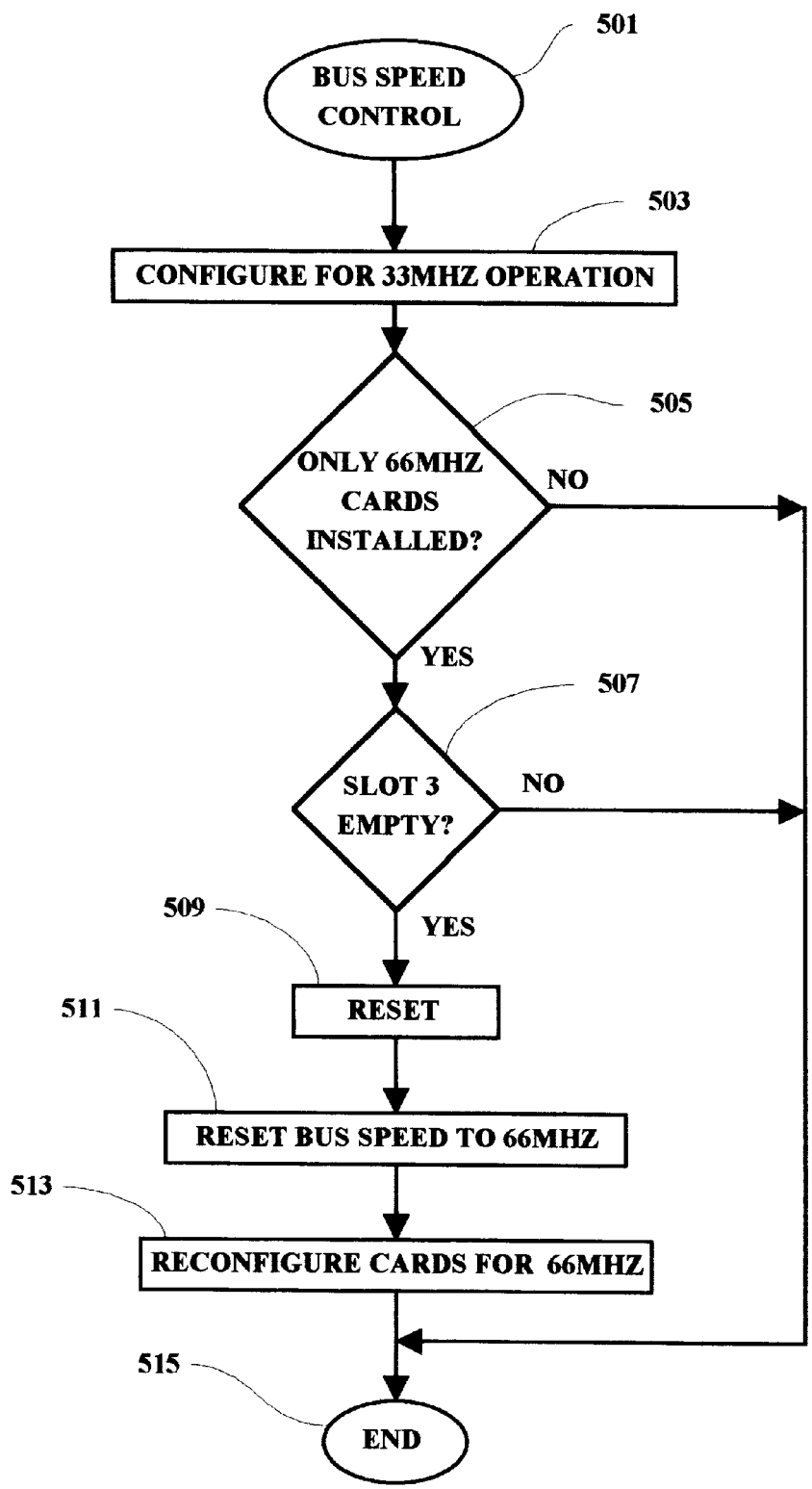
FIG. 5 is a flowchart illustrating another operational flow sequence for another exemplary embodiment of the disclosed methodology.

The second approach as implemented in the example of FIG. 2, can also be implemented using microcode. The code implementation would allow the frequency control logic 223 to be a simpler design. For example, as illustrated in the flow chart of FIG. 5, the bus speed control logic 501 would initially configure for 33 MHz operation 503. During configuration, if it is determined that only 66 MHz cards are installed 505, and that slot#3 221 is empty 507, then the cards could be reset 509, the clock restarted 511 to 66 MHz, and then the adapters or cards reconfigured 513 and operated at 66 MHz and the process would end 515. If there are other than 66 MHz cards installed 505 in either of the first two slots 217 or 219, or if slot#3 221 is occupied 507, then the operation would continue at the initially configured 33 MHz and the bus speed control function would terminate.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The methodology may also be implemented solely or partially in program code stored on a CD, disk or diskette (portable or fixed), or other memory or storage device, from which it may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for operating a device bus, said device bus being arranged to have a number of devices connected thereto, said device bus being arranged to be connected to a clock signal source, said clock signal source being selectively operable to provide a plurality of clock signals with each of said clock signals having a different frequency, said method comprising:

determining said number of said devices being connected to said device bus; and applying one of said clock signals to all devices connected to said device bus, said one of said clock signals being determined depending upon said number of said circuit devices being connected to said device bus.

2. A method for operating a device bus, said device bus being arranged to have circuit devices connected thereto, said device bus being arranged to be connected to a clock signal source, said clock signal source being selectively operable to provide at least first and second clock signals at first and second frequencies, respectively, to said circuit devices connected to said device bus, said method comprising:

determining a device number, said device number being representative of a number of said circuit devices being connected to said device bus;

applying said first clock signal to all circuit devices connected to said device bus if said device number exceeds a first predetermined number; and applying said second clock signal to all circuit devices connected to said device bus if said device number is less than a second predetermined number.

3. The method as set forth in claim 2 wherein said first frequency is less than said second frequency.

4. The method as set forth in claim 3 wherein said device bus is a PCI bus.

5. The method as set forth in claim 3 wherein said circuit devices are removable circuit cards arranged to be selectively coupled to said device bus.

6. The method as set forth in claim 5 wherein said circuit devices further include circuit embodiments which are permanently connected to said device bus.

7. The method as set forth in claim 2 and further including:

for each of said circuit devices, determining a device frequency at which said circuit devices are capable of running; and applying said first clock signal to all circuit devices connected to said device bus if any of said circuit devices is capable of running only at said first frequency.

8. The method as set forth in claim 7 wherein said device bus includes 1st and second bus segments, each of said first and second bus segments being capable of having circuit devices connected thereto, said method further including:

selectively connecting said first bus segment to said second bus segment when said device bus is operating at said first frequency, whereby a greater number of circuit devices are selectively operated at said first frequency than a number of circuit devices capable of operating if said device bus is operated at said second frequency.

9. The method as set forth in claim 8 and further including:

selectively disconnecting said second bus segment from said first bus segment when said device bus is being operated at said second frequency, whereby relatively fewer circuit devices are operated when said device bus is operated at said second frequency.

10. The method as set forth in claim 9 wherein said first frequency is less than said second frequency.

11. The method as set forth in claim 10 wherein said device bus is a PCI bus.

12. The method as set forth in claim 11 wherein said first frequency is 33 MHz and said second frequency is 66 MHz.

13. The method as set forth in claim 7 and further including:

applying said second clock signal to all circuit devices connected to said device bus if all of said circuit devices are capable of running at said second frequency and said number of circuit devices is less than said second predetermined number.

14. The method as set forth in claim 2 wherein said step of determining is accomplished during a configuration cycle of said device bus.

15. A method for operating a device bus, said device bus being arranged to have circuit devices connected thereto, said device bus being arranged to be connected to a clock signal source, said clock signal source being selectively operable to provide at least first and second clock signals at first and second frequencies, respectively, to said circuit devices connected to said device bus, said method comprising:

configuring said device bus for operation at said first frequency;

determining that all said circuit devices connected to said device bus are capable of running at said second frequency;

determining that all of said circuit devices connected to said device bus is less than a predetermined number;

resetting said circuit devices to operate at said second frequency; and resetting said device bus to run at said second frequency.

16. An information processing system comprising:

a CPU device;

a system bus, said CPU device being coupled to said system bus;

a device bus;

a bridge circuit connected between said system bus and said device bus, said device bus being coupled to a plurality of connection slots, said connection slots being arranged for selectively providing connection of said circuit devices to said device bus;

first detection means coupled to said connection slots, said first detection means being arranged for detecting which of said connection slots contain circuit devices;

second detection means coupled to said connection slots, said second detection means being arranged for detecting a frequency at which said circuit devices are capable of running; and clock control means coupled to said first and second detection means and said connection slots, said clock control means being selectively operable in response to outputs from said first and second detection means for selectively applying one of first or second clock signals to said circuit devices.

17. The system as set forth in claim 16 wherein said device bus is comprised of first and second bus segments, said system further including:

a switching device connected between said first and second bus segments, said switching device being selectively operable for connecting predetermined lines of said first and second bus segments in response to outputs from said first and second detection means.

* * * * *